United States Patent [19]

Franks et al.

[11] 4,256,613
[45] Mar. 17, 1981

[54] COMPOSITION AND PROCESS FOR MAKING PRECIPITATED NYLON-CELLULOSE BICONSTITUENT COMPOSITION

[75] Inventors: Neal E. Franks, Suffern, N.Y.; Julianna K. Varga, Asheville, N.C.

[73] Assignee: Akzona Incorporated, Asheville, N.C.

[21] Appl. No.: 54,357

[22] Filed: Jul. 2, 1979

Related U.S. Application Data

[63] Continuation-in-part of Ser. No. 938,907, Sep. 1, 1978, Pat. No. 4,196,282, which is a continuation-in-part of Ser. No. 854,957, Nov. 25, 1977, Pat. No. 4,145,532.

[51] Int. Cl.$^3$ .............................................. C08L 1/02
[52] U.S. Cl. .................................. 260/13; 260/29.2 N; 260/30.4 R; 260/30.4 N; 536/36; 536/56; 536/57; 264/DIG. 61
[58] Field of Search ................... 260/30.4 R, 30.4 N, 260/13, 29.2 N

[56] References Cited

U.S. PATENT DOCUMENTS

| | | | |
|---|---|---|---|
| 2,179,181 | 11/1939 | Granacher et al. | 106/163 R |
| 2,744,292 | 5/1956 | Schlosser et al. | 106/168 |
| 3,382,185 | 5/1968 | Wheeler et al. | 260/30.4 N |
| 3,447,939 | 6/1969 | Johnson | 536/43 |
| 3,508,941 | 4/1970 | Johnson | 106/162 |
| 3,758,457 | 9/1973 | Broeck et al. | 536/57 |
| 4,118,350 | 10/1978 | Turbak et al. | 260/15 |
| 4,145,532 | 3/1979 | Franks et al. | 536/56 |

OTHER PUBLICATIONS

Chem. Absts.–vol. 81: 154,860q, "Dissolution of Cellulose in Organic Solvents in the Presence of Small Amounts of Amines and Sulfur Dioxide", Yamazaki et al.

*Primary Examiner*—Edward M. Woodberry
*Attorney, Agent, or Firm*—Francis W. Young; Jack H. Hall; H. Walter Haeussler

[57] ABSTRACT

A composition and process are provided for making precipitated biconstituent nylon-cellulose shaped articles by dissolving a nylon having an amide group index of less than about 145, in a mixture of a tertiary amine oxide solvent and water, containing from about 0.5% to about 11% water based on the weight of the solution; separately forming a solution of cellulose in a tertiary amine oxide solvent containing from about 0.8 to about 29% water based on the weight of the solution and then interdispersing the two solutions to form a biconstituent dispersion. Shaped articles can be formed from the biconstituent dispersions of the invention.

17 Claims, No Drawings

COMPOSITION AND PROCESS FOR MAKING PRECIPITATED NYLON-CELLULOSE BICONSTITUENT COMPOSITION

CROSS REFERENCE TO RELATED APPLICATIONS

This application is a continuation-in-part of application Ser. No. 938,907 filed Sept. 1, 1978, now U.S. Pat. No. 4,196,282 issued Apr. 1, 1980 which in turn is a continuation-in-part of application Ser. No. 854,957, filed Nov. 25, 1977, now U.S. Pat. No. 4,145,532, issued Mar. 20, 1979.

BACKGROUND OF THE INVENTION

A process for dissolving nylon, cellulose or other materials having strong intermolecular hydrogen bonding in a tertiary amide oxide is disclosed by Johnson in U.S. Pat. No. 3,447,939. A cyclic mono(N-methylamine N-oxide) compound such as N-methylmorpholine N-oxide is used as the solvent. The solution can be used in chemical reactions involving the dissolved polymer or to precipitate the polymer to form a film or filament. The resulting solutions, insofar as the actual examples of the patent indicate, have significant disadvantages because they are of low solids content and have a high viscosity.

In accordance with the process disclosed in U.S. Pat. No. 3,508,941, two or more different polymers are dissolved in a cyclic mono(N-methylamine N-oxide) compound and are precipitated together to produce a bicomponent polymer mixture. A diluent such as dimethyl sulfoxide, N-methylpyrrolidone or sulfolane may be added to the solution as a diluent to reduce its viscosity. The solutions also have the same deficiences noted for the first mentioned patent.

U.S. Pat. No. 4,145,532, and copending application Ser. No. 938,907 filed Sept. 1, 1978, to the inventors herein, discloses cellulose solutions and precipitated cellulose articles formed from a tertiary amine oxide solvent containing up to about 29% water.

In application Ser. No. 54,358 by the inventors herein, filed of even date with this application, entitled "Composition and Process For Making Precipitated Nylon", a composition and process are described for making nylon by dissolving a nylon (having an amide group index of less than about 145) in a mixture of a tertiary amine oxide solvent and water. The resultant nylon solutions contain from about 0.5% to about 11% water.

It is noted that when one attempts to simultaneously dissolve a mixture of nylon and cellulose in a tertiary amine oxide, even when in admixture with an appropriate amount of water, unsatisfactory solutions were obtained because of significant decomposition.

DESCRIPTION OF THE INVENTION

A composition and process are provided for making precipitated biconstituent nylon-cellulose shaped articles by dissolving a nylon having an amide group index of less than about 145, in a mixture of a tertiary amine oxide solvent and water, containing a nylon solubility enhancing amount of water, from about 0.5% to about 11% by weight based on the weight of the solution; separately forming a solution of cellulose in a tertiary amine oxide solvent containing a cellulose solubility enhancing amount of water from about 0.8 to about 29% by weight based upon the weight of the solution, and then interdispersing the two solutions to form a biconstituent dispersion wherein the nylon and cellulose comprise distinct separate phases. Based on preliminary studies it appears that in some instances nylon may form a discontinuous phase. Shaped articles can be formed from the biconstituent dispersions of the invention, wherein the article contains the two interdispersed polymers.

The nylon solutions employed in the invention are disclosed in copending application Ser. No. 54,358 of even date herewith, by the inventors herein, entitled "Composition and Process For Making Precipitated Nylon", which application is hereby incorporated by reference.

In the nylon solutions useful in the invention, a nylon (or mixtures of nylons), having an amide group index of less than about 145 and preferably less than about 125, (amide group index=molecular weight of repeating unit ÷ number of amide groups per repeating unit) is mixed with a solvent therefor containing a tertiary amide oxide and water with a specifically defined critical range of water to provide a solution of increased solids content and of lower dissolution temperature.

The range of the amount of water present in the amide oxide-water-nylon solution is a nylon solubility enhancing amount of water between about 0.5% to about 11%, preferably between about 1% to about 11% and most preferably between about 1.5% to about 11% by weight of water based upon the weight of the solution.

The amine oxide employed in the nylon solutions must display certain essential characteristics. The amine oxide must be substantially stable at least at about 125° C., preferably at about 130° C. and most preferably at 140° C. and must contain a N-methyl amine oxide group, endo or exo to an aromatic or a saturated or unsaturated ring i.e. corresponding to the formula

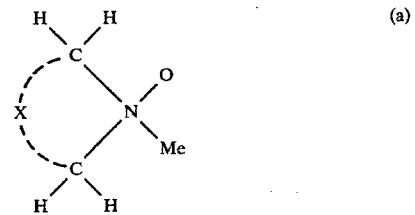

(a)

where X is a radical chain comprising 2 to 4 carbon atoms completing the ring;

(b)

where Me is methyl, and Z is an aromatic or a saturated or unsaturated 5-, 6-, or 7- membered ring, unsubstituted or substituted only by methyl in positions where the resulting ring width is less than about 5.15 Å or (ii) CH₂CH₂W where W can be OH, SH, or NH₂.

Tertiary amine oxides which may be used in practicing the invention include N-methylmorpholine N-oxide, and N,N-dimethylcyclohexylamine N-oxide.

The nylons which can be employed in this invention include any fiber forming nylon, having an amide group index of less than 145, and preferably less than 125. If desired, mixtures of suitable nylon polymers can be employed. The presently preferred nylons include nylon 4, nylon 6, nylon 6,6 and nylon 6,T (polyhexamethylene terephthalamide). Nylons 6,9 or 6,10 can also be employed. The inventors have found that nylons such as nylon 6,12 and nylon 11 present significant difficulties when solutions are attempted.

The cellulose solutions which are used in the process of the invention are formed by the process described in U.S. Pat. No. 4,145,532 and application Ser. No. 938,907, filed Sept. 1, 1978, both of which are hereby incorporated by reference. The amount of cellulose dissolved in the solution may be varied up to about 44% by weight of solution.

The amine oxides used to dissolve the cellulose should have a ring structure with a width of less than about 5.15 Å, and a dipole moment of at least about 4.5 Debyes.

The following amine oxides have been found to exhibit the solvency for cellulose:
N-methylhomopiperidine oxide
N-methylmorpholine oxide
N,N-dimethylcyclohexylamine oxide
N,N-dimethylbenzylamine oxide.

The foregoing amide oxides may also be represented by formulae (a) and (b) above.

However, substitution of a diethylamino group for the dimethylamino group results in an inoperative composition. Similarly, substitution of other groups which results in a molecule in which the width of the ring is greater than 5.15 Å, results in a molecule which will not fit into the hydrophobic portion of the cellulose molecule and therefore will not exhibit solvency for cellulose.

Several solvents coming within the invention that do not meet the cyclic requirements for the hydrophobic end can be explained on the basis of a "pseudo-ring" structure. For instance, N,N-dimethylethanolamine oxide can be represented by a ring structure which may explain its ability to dissolve cellulose as follows:

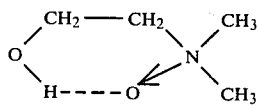

This molecule meets the spatial requirements postulated for the ring dimension to fit into the hydrophobic portion of the cellulose molecule. Moreover, it has been observed that dimethylamino-2-propanol N-oxide will not dissolve cellulose under the conditions of this invention and this observation would seem to lend support to the "pseudo-cyclic" structure proposed above in view of the larger dimension of the ring portion, i.e., greater than 5.15 Å, as follows:

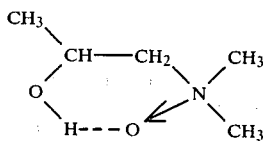

When these two compounds are viewed in the pseudo-cyclic representation, there is a close similarity to the N-methylmorpholine oxide series in which 2,6-dimethyl-N-methylmorpholine oxide is not an effective solvent for cellulose, although N-methylmorpholine oxide is.

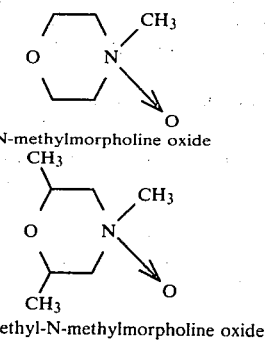

N-methylmorpholine oxide 2,6-Dimethyl-N-methylmorpholine oxide

Tertiary amine oxides which may be used to advantage when mixed with water for dissolving cellulose include, N,N-dimethylbenzylamine oxide, N,N-dimethylcyclohexylamine oxide, N-methylmorpholine oxide, N-methylhomopiperidine oxide.

The percentage range of water required in the solvent will vary with the tertiary amine oxide in the solvent.

However, using as a solvent N-methylmorpholine N-oxide with up to about 22% by weight water a solution containing up to about 38% by weight cellulose based on total solution can be achieved; with N,N-dimethylethanolamine N-oxide as solvent containing from up to about 12.5% by weight water the solution will contain from up to 31% by weight cellulose; with N,N-dimethylbenzylamine N-oxide as solvent containing from about 5.5% to about 17% by weight water the solution will contain from about 1% to about 20% cellulose; with N,N-dimethylcyclohexylamine N-oxide as solvent containing from up to about 21% by weight water the solution will contain up to about 44% by weight cellulose; with N-methylhomopiperidine N-oxide as solvent containing from about 5.5% to about 20% by weight water the solution will contain from about 1% to about 22% by weight cellulose; with 2(2-hydroxypropoxy)-N-ethyl-N,N-dimethylamine N-oxide as solvent containing from about 5% to about 10% by weight water, the solution will contain from about 2% to about 7.5% by weight cellulose; with N-methylpiperidine N-oxide as solvent containing up to about 17.5% by weight water, the solution will contain from about 5% to about 17.5% cellulose.

While the above amine oxides are useful in formulating cellulose amine oxide-water solutions, not all of those amine oxides are useful in the present invention. The biconstituent dispersions of the invention are formed at a polymer solution maintaining temperature higher than that at which one of the phases is molten. Therefore, only those amine oxides, which are substantially stable at the polymer solution maintaining temperatures can be employed.

The biconstituent solutions of the invention may be formed by admixing the two preformed solutions in the liquid state, i.e., the cellulose-amine oxide-water solution and the nylon-amine oxide-water solution at a temperature which is above the precipitation or solidification point of the highest temperature precipitating or solidifying solution of the two solutions being combined, or the precipitation temperature of the first to precipitate polymer solution within the dispersion, whichever is higher. This results in a dispersion of two continuous phases intertwined into each other.

Alternatively, a mixture may also be formed by adding a solid, ground nylon solution to the molten cellulose solution, or by adding solid, ground nylon solution to a solid, ground cellulose solution and heating to the temperature at which the cellulose solution becomes liquid. In either case, a dispersion of a discontinuous nylon phase in a continuous phase of cellulose is formed.

By adding a ground solid, cellulose solution to a liquid nylon solution, a mixture of 2 continuous phases interdispersed within each other can be formed, since the cellulose solution liquifies at the higher nylon solution-maintaining temperature.

Also, two solutions may be admixed in proportions such that the ratio of nylon to cellulose in the resultant dispersion is between about 1:99 to about 99:1 and preferably in excess of about 50:50. Most preferably, the two solutions are admixed to provide dispersions having a ratio of nylon to cellulose in excess of about 80:20.

It is noted that the amine oxide solvents which dissolve cellulose and the above described nylons are not coextensive, therefore two distinct possibilities exist: the amine oxide(s) employed in both solutions in conjunction with water can solubilize both the cellulose and the nylon; or, two different amine oxides are employed in the two precursor solutions, one of which is a solvent for both polymer types, while the other amine oxide is only a solvent for cellulose due to relatively low higher temperature stability. While either of the above solvent selections can be employed in the biconstituent dispersions of the invention, it is preferred that the amine oxide(s) employed be a solvent for both polymer types.

If desired, a non-reactive organic co-solvent may be used in quantities, for example, up to about 25% by weight of the precursor solutions in either one or both of the precursor solvents, for example, as a less expensive diluent for the amine oxide, or to lower the viscosity of the solution.

Preferably, the biconstituent dispersions of the invention have a solids content of about 32% or less. In addition, a presently preferred embodiment, when using N-methyl morpholine N-oxide in the solvent, is a biconstituent dispersion containing about 7% or less of cellulose based on the weight of the total solution. Naturally, the lower the temperatures which have to be maintained during mixing, and the shorter the residence times at these temperatures, the more cellulose can be added without detrimental effect on color or other desirable porperties.

The nylon-cellulose biconstituent dispersions of the invention are adapted for shaped article production, such as by extrusion or spinning, followed by coagulation in a non-solvent, for example, water, to remove the solvent from the films or filaments. The shaped articles have a biconstituent polymer composition wherein one of the polymer types can be a discontinuous dispersed phase with a continuous phase comprising the other polymer type or where two continuous phases are interdispersed into each other.

It is noted that the amine oxides contemplated by the invention are sometimes referred to as amine oxides, but they are more properly termed "tertiary amine N-oxides".

There follow examples of the invention which are considered illustrative rather than limiting. All parts and percentages are by weight unless otherwise specified. All temperatures are degrees Centigrade.

EXAMPLE 1

A nylon solution was made by dissolving 5.3 parts of ground, bright, undelustered, nylon 6 chips in 30 parts of N,N-dimethylcyclohexylamine oxide (DMCHA-O) (containing 11.9% water) by heating and stirring at 120°–125° C. for 20 minutes. Similarly, sufficient cellulose (Buckeye V-60 dissolving pulp) was dissolved in another portion in the same DMCHA-O-water solvent to form a solution containing 20% cellulose. The two solutions, at 120°–125° C., were admixed by adding the cellulose solution to the nylon solution and stirred for 5 minutes. There resulted a biconstituent dispersion of medium high viscosity from which a fiber was drawn which, after washing, was continuous but weak.

EXAMPLE 2

Following the procedure of Example 1 and employing the DMCHA-O-water solvent of Example 1, 11.7 parts of a 15% nylon 6 solution was admixed with 30 parts of a 20% cellulose solution. The resultant biconstituent dispersion had a viscosity higher than in Example 1 and produced a weak but continuous fiber.

EXAMPLE 3

Following the procedure of Example 1 and employing the DMCHA-O-water solvent in Example 1, 5.8 parts of a 15% nylon 6 solution were admixed with 30 parts of a 20% cellulose solution. The resultant biconstituent dispersion was similar in viscosity to the dispersion of Example 2, and provided a fiber stronger than and having more elongation than the fiber in Example 2.

EXAMPLE 4

Following the procedure of Example 1 and employing the DMCHA-O-water solvent in Example 1, 5 parts of a 15% bright, undelustered, nylon 6 solution were admixed with 30 parts of a 25% cellulose solution (dark solution). The cellulose solution was added to the nylon solution (both at 120°–125° C.) and the admixture stirred for 15 minutes to yield a highly viscous solution without any apparent further decomposition. The warm dispersion demonstrated good stretchability and produced a good medium strength fiber (m.p. 95°–100° C.).

EXAMPLE 5

Following the procedure of Example 1 and employing the DMCHA-O-water solution of Example 1, 5 parts of a 15% bright, undelustered, nylon 6 solution were admixed with 40 parts of a 20% cellulose solution. The resultant dispersion was slightly yellow, was slightly opaque, and had a slightly lower viscosity than the dispersion of Example 4. A fiber produced from the solution was similar to that of Example 4 (m.p. 95°–100° C.).

EXAMPLE 6

A nylon solution was made by dissolving 0.75 parts of bright, undelustered, nylon 6 in 4.25 parts of DMCHA-O containing 11.6% water at 120°–125° C. Similarly, sufficient V-60 cellulose was dissolved in a NMMO-DMCHA-O (75:25) containing 10% water at 130° C. The solutions were mixed at 130° C. The resultant dispersion was very viscous. A resultant fiber was of the same quality as in Example 4.

EXAMPLE 7

Following the procedure of Example 1 and employing the solvent system of Example 1, a 15% nylon 6 solution at 120° C. was mixed with a 15% cellulose solution at 90° C. and stirred at 210 RPM for 5 minutes. The resultant low viscosity dispersion yielded a weak opaque fiber.

EXAMPLE 8

In a comparison, 2.8 parts of bright, undelustered nylon 6 chips were added to a mixture of 8.4 parts of cellulose (Buckeye Visco Cell ELV) swollen in 45 parts of DMCHA-O, containing 12.0% water, heated at 90° C. After two hours at 120° C., undissolved nylon chips remained and decomposition was evident.

EXAMPLE 9

A nylon solution was made by dissolving 1.7 parts of bright, undelustered, nylon 6 in 10 parts of N-methyl-morpholine oxide (NMMO) containing 9.6% water and heating and stirring at 150° C. for 45 minutes. Similarly, sufficient cellulose was dissolved in another portion of the same NMMO-water solvent to form a solution containing 20% cellulose. The two solutions, at 150° C., were admixed by adding the nylon solution to the cellulose solution and stirring for 15 minutes at 150° C. The resultant biconstituent dispersion produced a weak fiber after washing it substantially free of the solvent.

EXAMPLE 10

A cellulose, N-methylmorpholine N-oxide (NMMO)-water solution was formed at 105° C., extruded and cut up into small pieces (composition 73.0% NMMO, 7.1% water, 19.9% cellulose). 2.5 parts, 5.0 parts and 10 parts of the cellulose solutions were added to 10 parts of a nylon 6 solution (from ground, bright, undelustered, nylon 6 chips-relative viscosity 2.45, 1% solution in 90% formic acid at 25° C.). The nylon 6 solution comprised 35% nylon, 6% $H_2O$ and 39% NMMO.

The results of the above and similar dispersion preparations are summarized in Table 1.

TABLE 1
DISPERSIONS OF NYLON 6 AND CELLULOSE IN NMMO

| NMMO | Nylon 6 | Cellulose | $H_2O$ | Total Solids | Dispersion Temperature °C. | Remelt Temperature °C. | Observations |
|---|---|---|---|---|---|---|---|
| 65.0 | 28.0 | 4.0 | 3.0 | 32.0 | 155 | 155 | light colored sol'n.; med. visc.; good stretchability |
| 66.3 | 23.4 | 6.6 | 3.7 | 30.0 | 155 | 155 | dark amber sol'n.; high vis.; good stretchability |
| 68.0 | 17.5 | 9.9 | 4.6 | 27.4 | 155 | 155 | dark brown sol'n.; high visc.; fair stretchability |
| 68.5 | 20.0 | 4.7 | 6.8 | 24.7 | 155–160 | 155 | light amber sol'n.; med. visc.; good stretchability |
| 72.0 | 0.9 | 22.7 | 4.4 | 23.6 | 145 | 145 | black, highly viscous; phase separation |
| 66.5 | 8.3 | 20.8 | 4.3 | 29.1 | 150 | — | black, decomposition |
| 60.7 | 25.0 | 10.0 | 4.3 | 35.0 | 155–160 | — | black, highly viscous |
| 77.5 | 13.3 | 3.3 | 5.9 | 16.6 | 155–160 | — | amber colored sol'n. forms weak film |
| 64.5 | 26.7 | 3.3 | 5.5 | 30.0 | 155–160 | — | dark amber colored sol'n. forms strong, stretchable film |
| 70.8 | 13.3 | 6.7 | 9.2 | 20.0 | 155–160 | — | poor mixing |
| 67.6 | 20.0 | 5.0 | 7.4 | 25.0 | 155–160 | — | dark colored sol'n., formed excellent film |
| 77.2 | 6.7 | 6.7 | 9.4 | 13.4 | 155–160 | — | poor sol'n., attempted film fell apart |
| 65.5 | 20.0 | 10.0 | 4.4 | 30.0 | 155–160 | — | high viscosity sol'n. - did not blend |
| 75.2 | 10.0 | 10.5 | 4.7 | 20.0 | 155–160 | — | dark colored sol'n., attempted film fell apart |
| 74.4 | 6.7 | 13.4 | 5.5 | 20.1 | 155–160 | — | dark colored sol'n., attempted film fell apart |

Initial Composition % (columns: NMMO, Nylon 6, Cellulose, $H_2O$)

EXAMPLE 11

To 17.13 g of a 10% cellulose solution in N-methyl morpholine N-oxide at a temperature of 100° C. was added 0.17 g of a ground solid nylon solution (30% in N-methyl morpholine N-oxide). After holding the mix at 100° C. for 25 minutes, no melting of the finely divided particles of nylon solution was observed. No cellulose decomposition was observed. The temperature was increased sequentially to 128° C. and 148° C. and held for 20 minutes at each temperature. The nylon chips did not melt, although the cellulose solution became darker and finally turned black. The particles of nylon solution could still be seen along the walls of the vessel, and, on cooling, were observed to be inpregnated in the cooled mix, indicating a discontinuous nylon phase in a continuous cellulose phase.

EXAMPLE 12

Example 11 was repeated except that the cellulose solution was solidified and ground before being added to the ground nylon solution. The mixture was then heated to 150° C. in a vessel in a glycol bath for 5 minutes. Although the cellulose decomposed quite rapidly after melting, on cooling the nylon particles (discontinuous phase) were dispersed in the cellulose (continuous phase).

It is noted that amine oxides are hydroscopic and thus tend to pick up water from the air are normal temperatures or up to a certain predetermined temperature, above which, when in admixture with water, they tend to release water vapor. The solution procedure and the water measurement procedures thus have some bearing on the amount of water initially employed and subsequently measured. If desired, water determinations on the solutions can be made using a C-Aqua-tester (Cat. No. 04-10-000, C. W. Brabender Instrument Co., S. Hackensack, N.J.).

As used herein, "substantial stability" means sufficient stability to provide useful shaped polymer forming solutions.

While the invention is described in detail above, it is understood that variation can be made by those skilled in the art without departing from the scope of the invention.

What is claimed is:

1. A biconstituent dispersion comprising:
   (A) a first distinct phase comprising a solution of
      (1) a nylon having an amide group index of less than about 145,
      (2) a tertiary amine oxide nylon solvent which has a N-methylamine oxide group endo or exo to an aromatic or a saturated or unsaturated ring and which has substantial stability at 125° C., and
      (3) a nylon solubility enhancing amount of water from about 0.5% to about 11% by weight based upon the combined weight of (1), (2) and (3), and
   (B) a second distinct phase comprising a solution of
      (1) cellulose
      (2) a tertiary amine oxide cellulose solvent, and
      (3) a cellulose solubility enhancing amount of water.

2. The dispersion as in claim 1 where the amide group index is less than about 125.

3. The dispersion as in claim 1 where the nylon is nylon 4, nylon 6, nylon 6,6 or nylon 6,T.

4. The dispersion as in claim 3 where the nylon is nylon 6.

5. The dispersion as in claims 1, 2, 3, or 4 where the amine oxide is N-methylmorpholine-N-oxide.

6. The dispersion as in claims 1, 2, 3, or 4 where the amine oxide is N,N-dimethylcyclohexylamine-N-oxide.

7. The dispersion as in claims 1, 2, 3, or 4 where the dispersion contains more nylon than cellulose.

8. A process for forming a biconstituent dispersion of a nylon and cellulose adapted for use in forming shaped biconstituent polymer articles which comprises:
   (A) separately forming a nylon solution comprising:
      (1) a nylon having an amide group index of less than about 145,
      (2) a tertiary amine oxide nylon solvent which has a N-methylamine oxide group endo or exo to an aromatic or a saturated or unsaturated ring and which has substantial stability at about 125° C., and
      (3) a nylon solubility enhancing amount of water from about 0.5% to about 11% by weight based upon the combined weight of (1), (2) and (3),
   (B) separately forming a cellulose solution comprising:
      (1) cellulose
      (2) a tertiary oxide cellulose solvent,
      (3) a cellulose solubility enhancing amount of water
   (C) admixing said separately formed solutions to provide a biconstituent dispersion.

9. The process as in claim 8 wherein the nylon and cellulose are present in a ratio of from about 1:99 to about 99:1.

10. The process as in claim 9 wherein the nylon and cellulose are present in a ratio of from about 5:95 to about 95:5.

11. The process as in claim 8 where the nylon to cellulose ratio is more than about 50:50.

12. The process as in claim 8 where the nylon to cellulose ratio is more than about 80:20.

13. The process as in claims 8, 9, 10, 11 or 12 wherein the nylon solution is added to the cellulose solution.

14. The process as in claims 8, 9, 10, 11 or 12 wherein the cellulose solution is added to the nylon solution.

15. The process as in claims 8, 9, 10, 11 or 12 wherein the amine oxide employed in (A) and the amine oxide employed in (B) are solvents, in conjunction with water, for both said nylon and said cellulose.

16. The process as in claims 8, 9, 10, 11 or 12 wherein the amine oxide cellulose solvent has substantial stability at about 125° C.

17. A process for precipitating a nylon cellulose biconstituent article which comprises shaping the solution of claims 1, 2, 3, or 4 and separating a biconstituent polymer article from the tertiary amine oxide.

* * * * *